United States Patent Office 2,712,405
Patented July 5, 1955

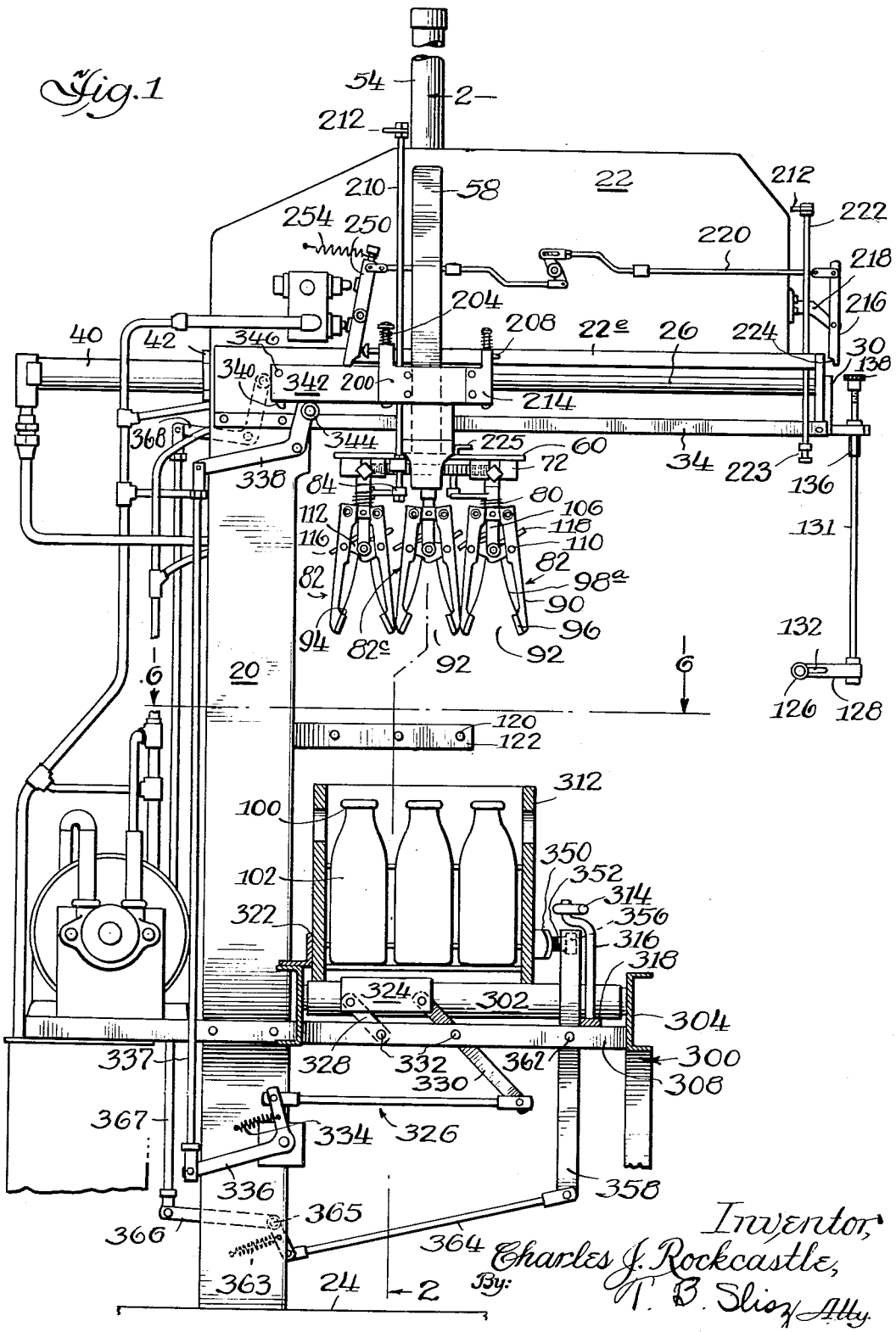

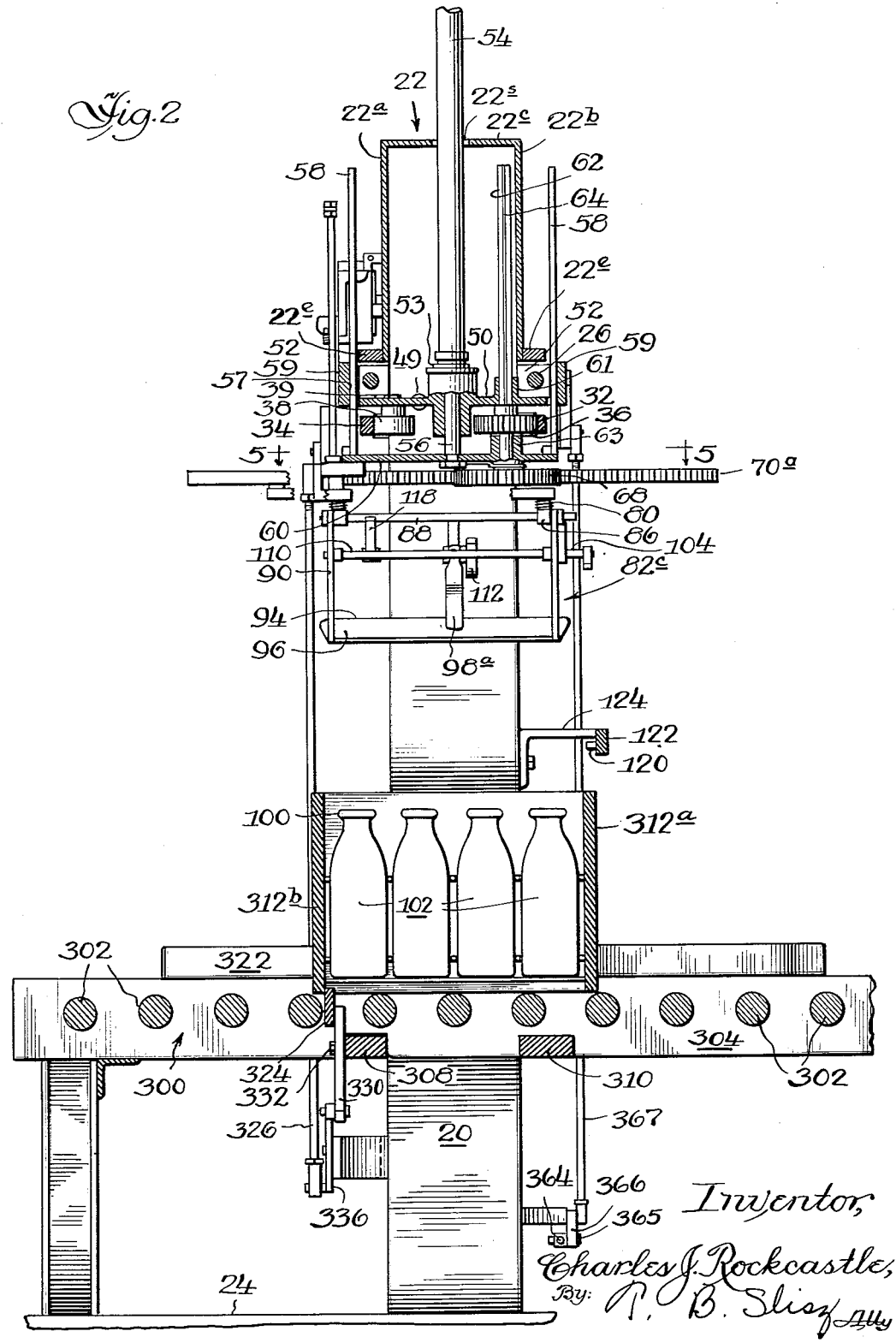

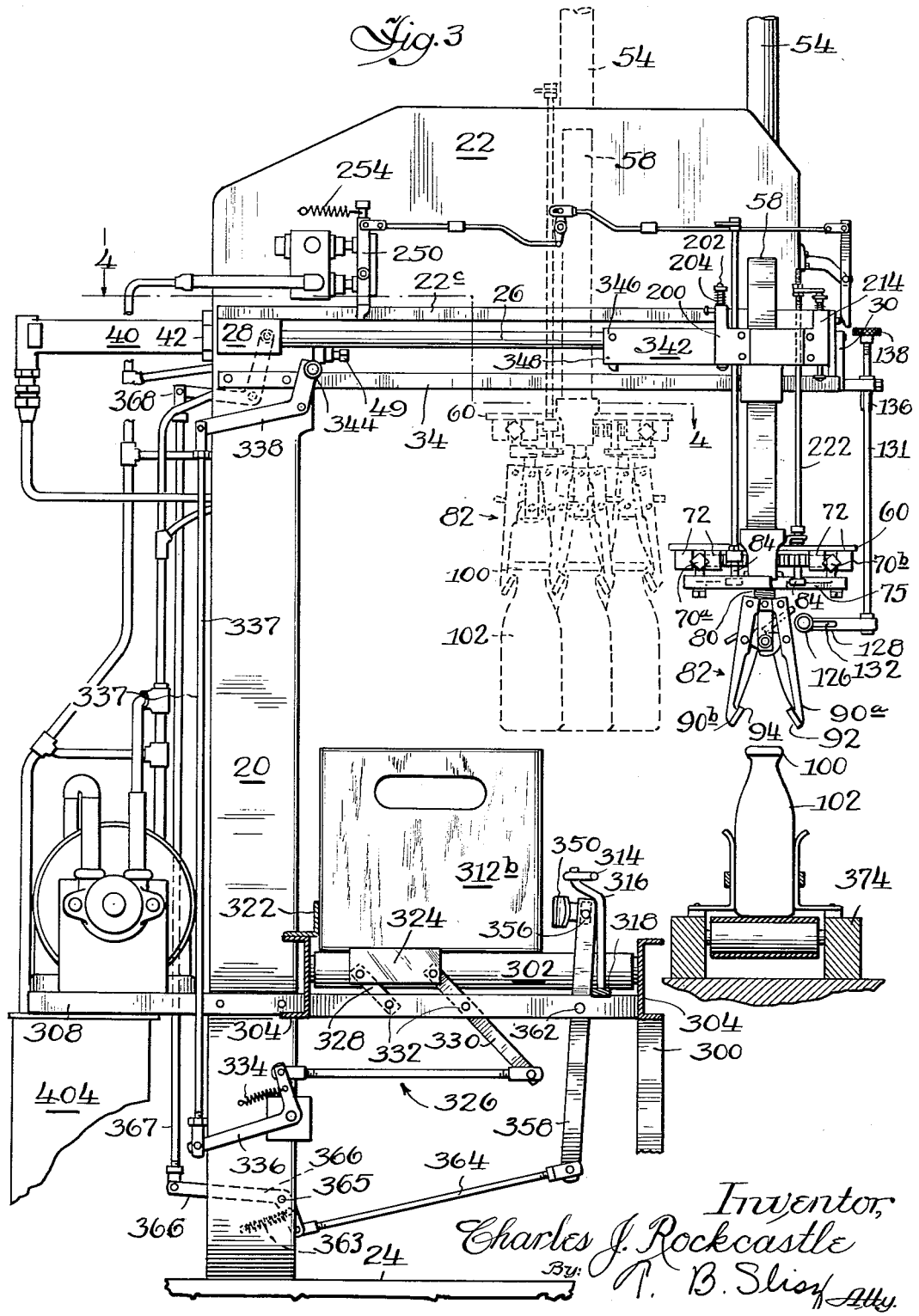

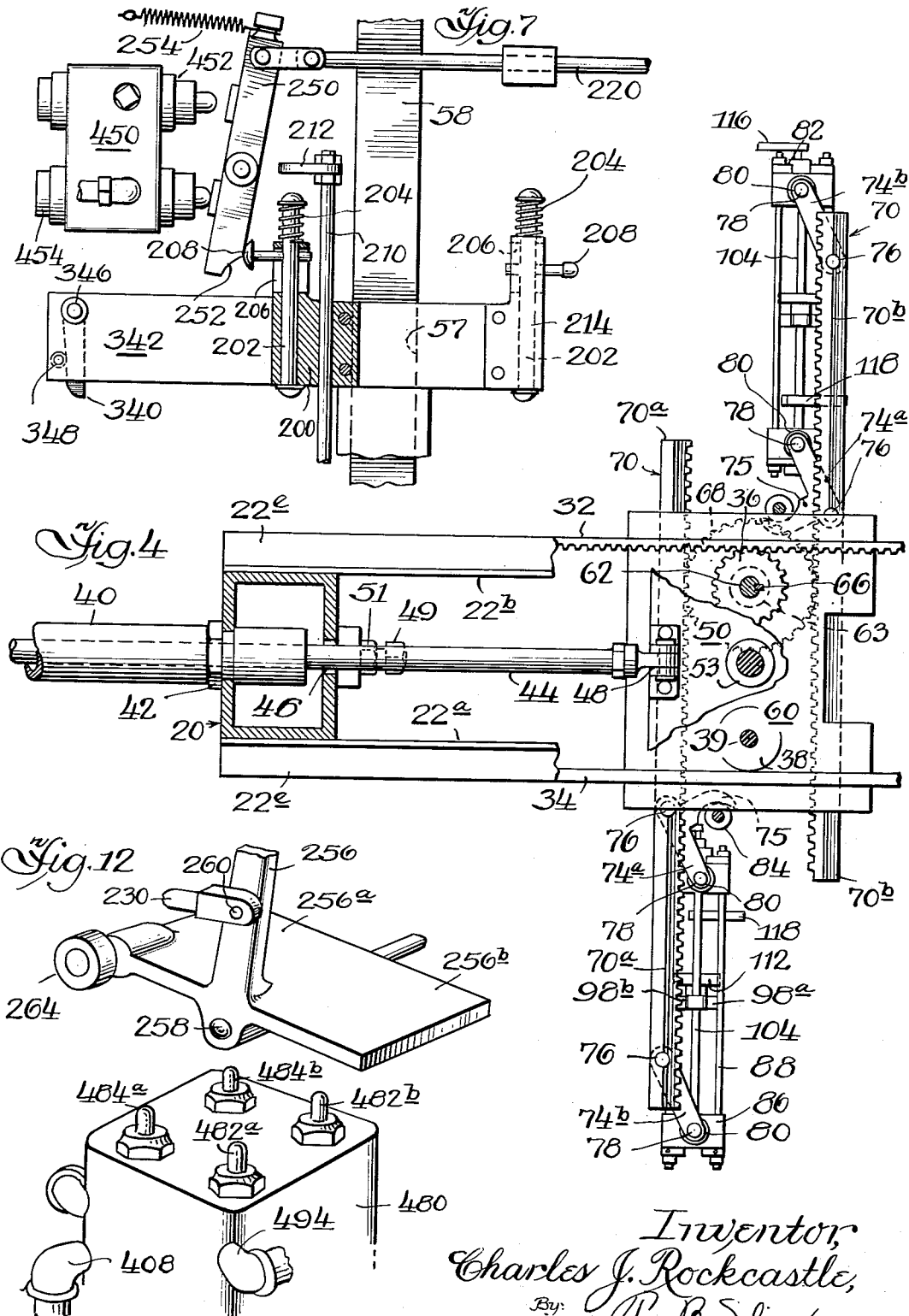

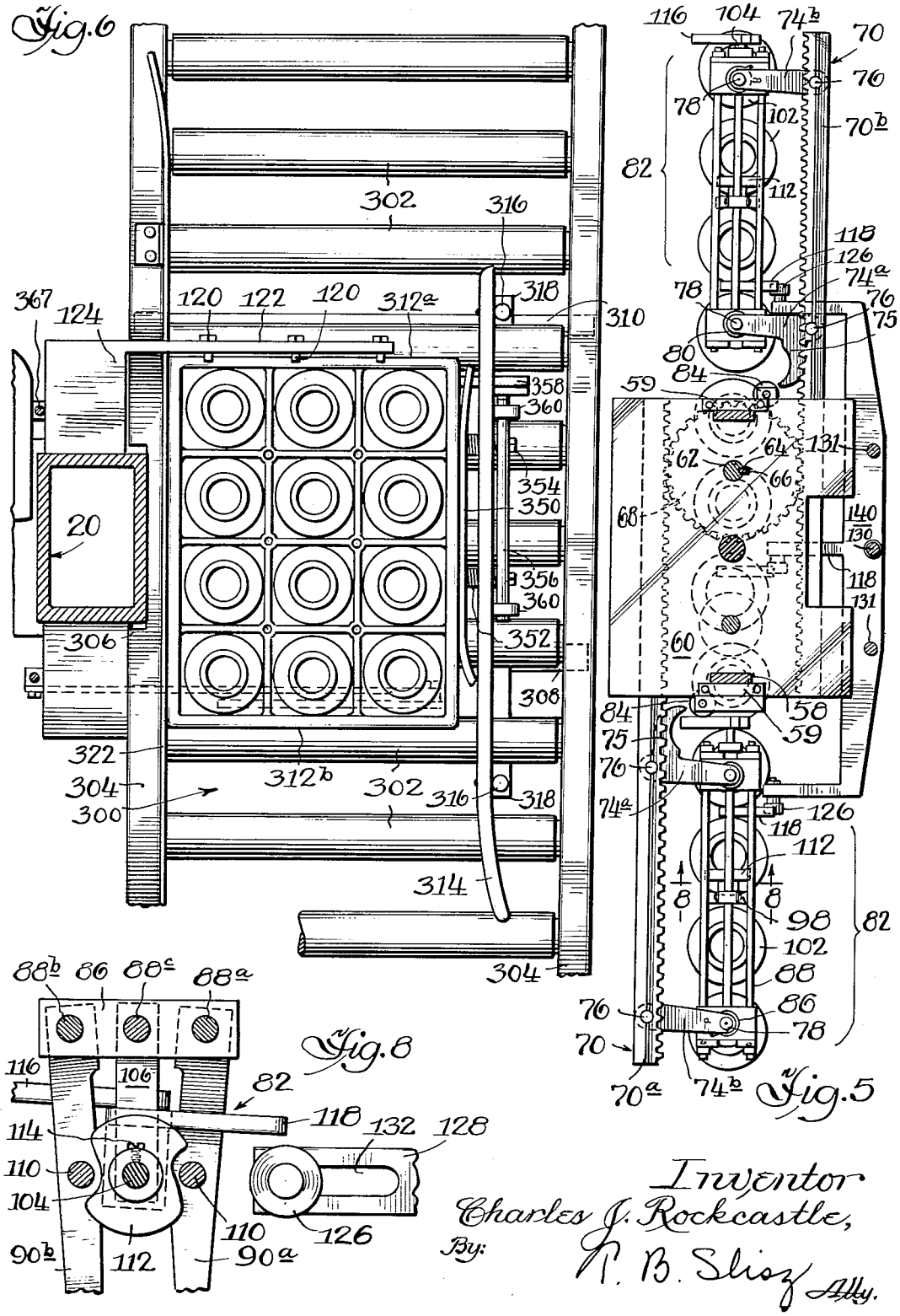

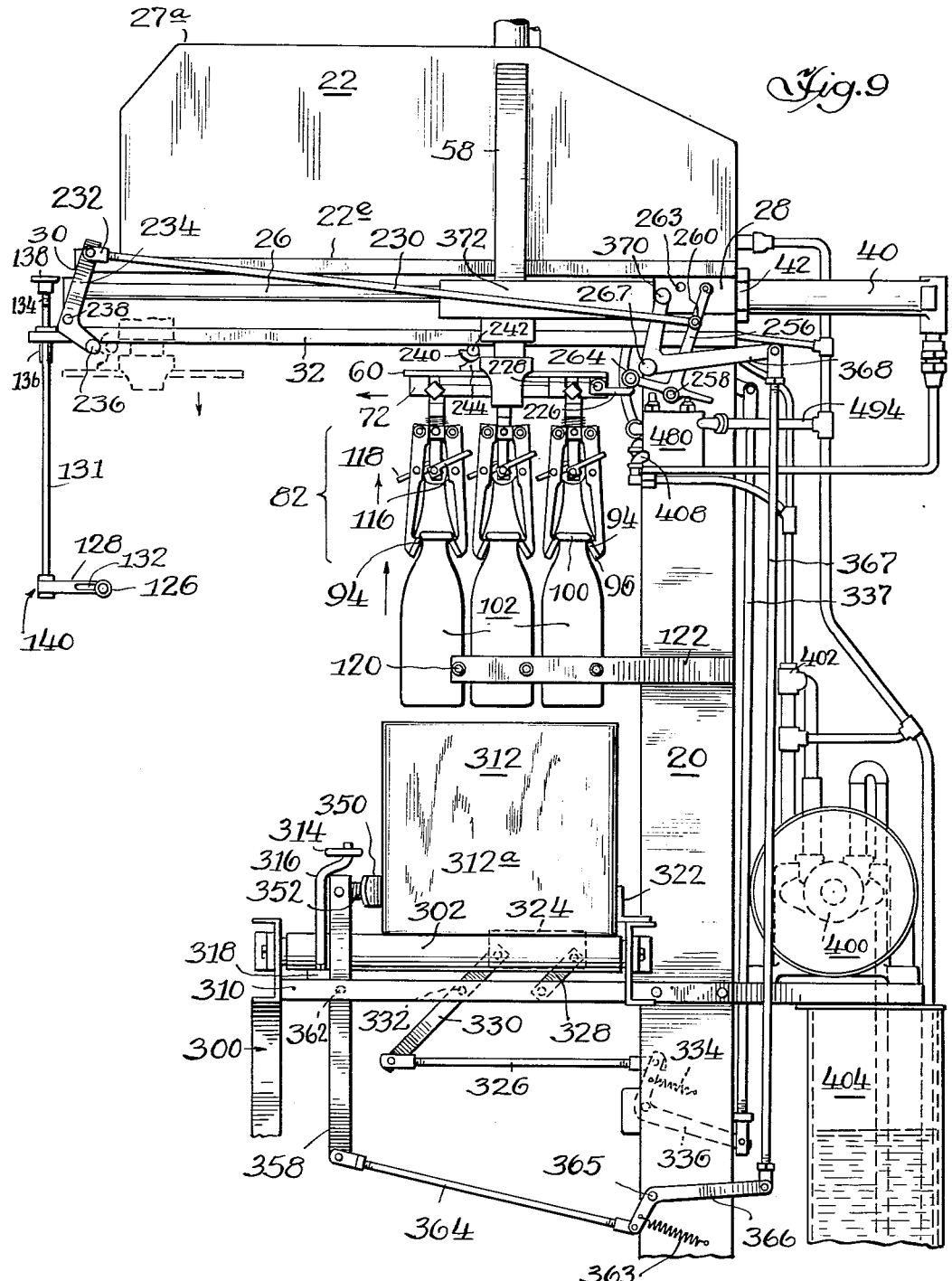

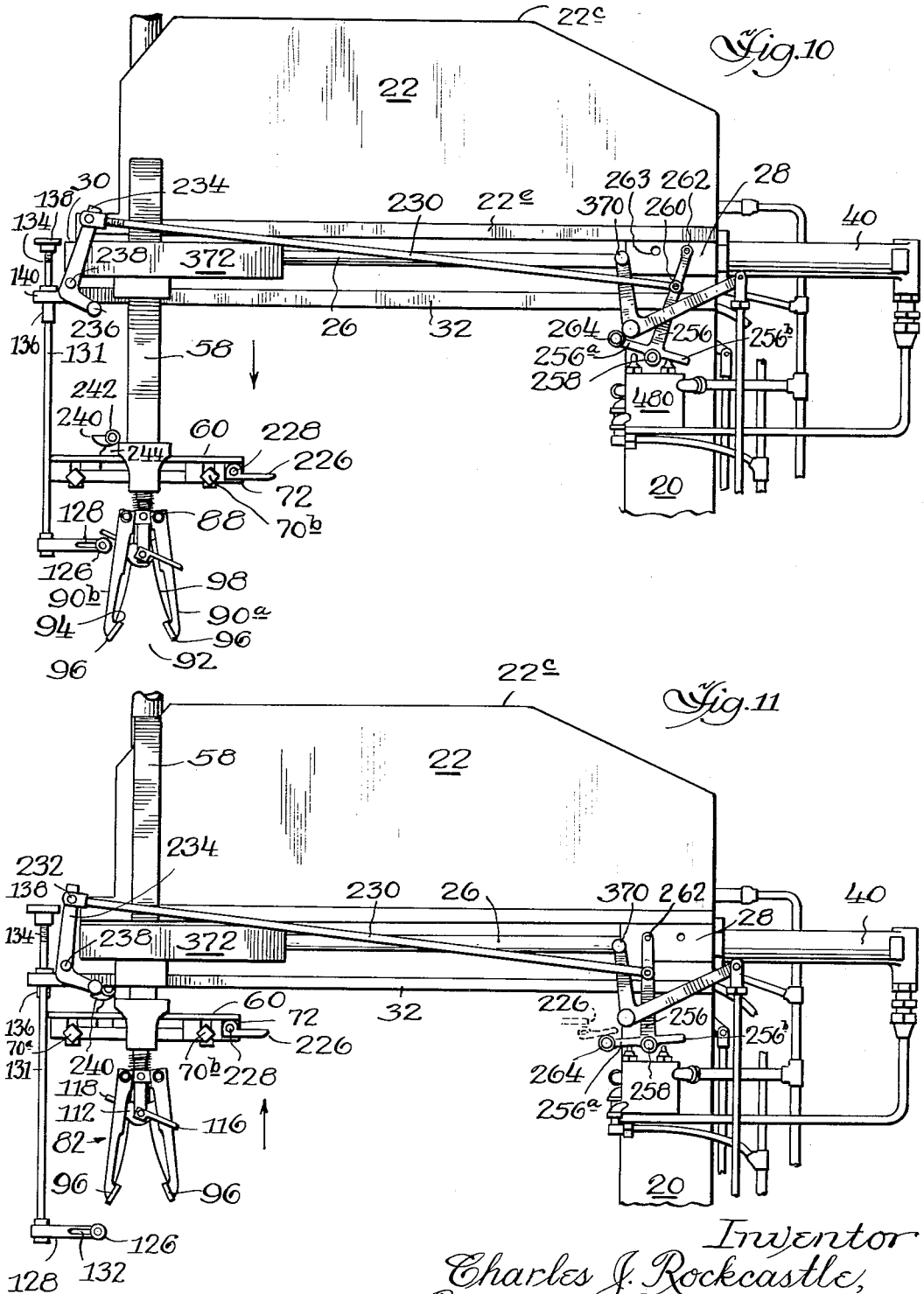

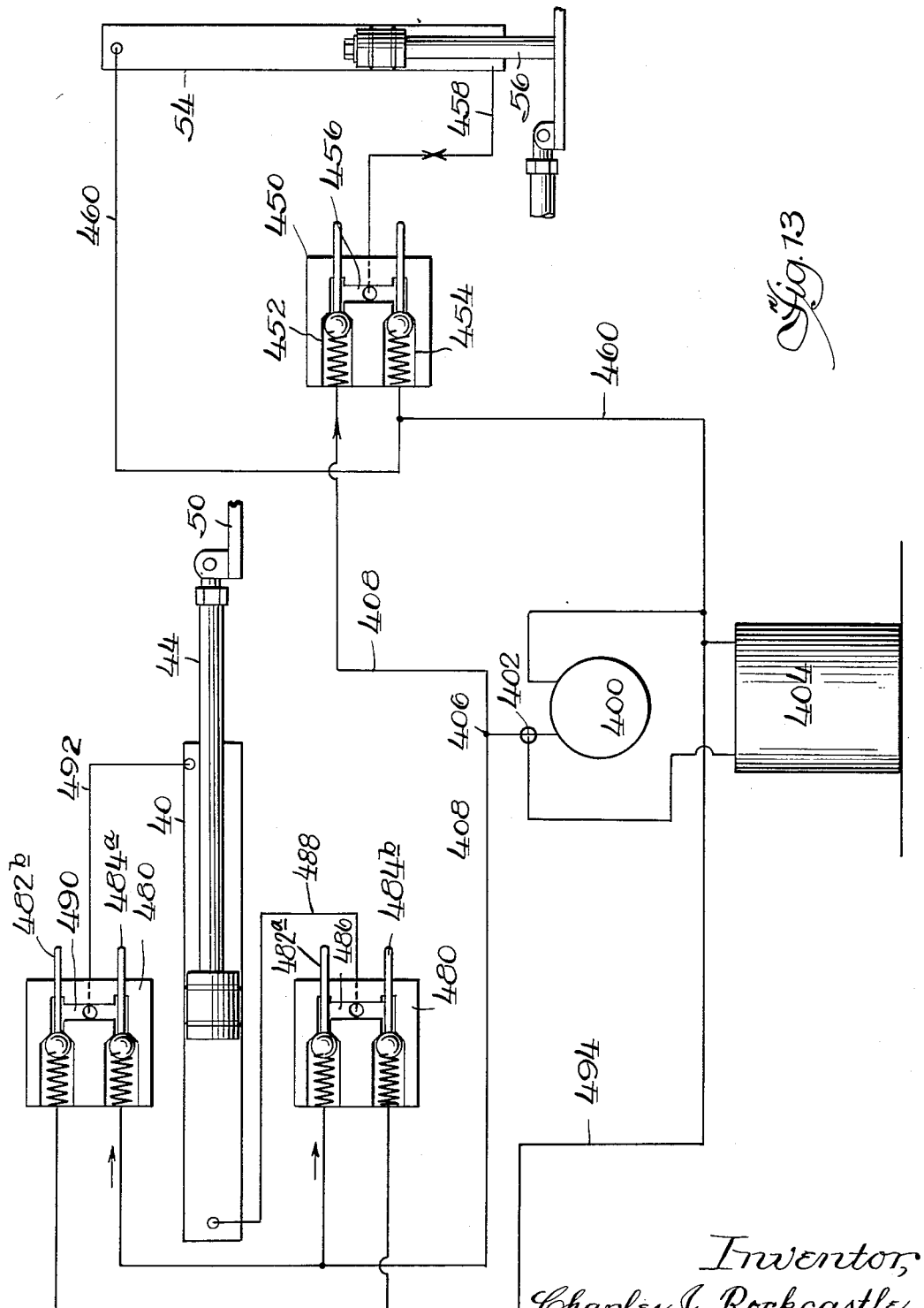

2,712,405

CASE LOADING AND UNLOADING DEVICE

Charles J. Rockcastle, Chicago, Ill., assignor to Active Products Inc., Chicago, Ill., a corporation of Illinois Application December 18, 1950, Serial No. 201,344

37 Claims. (Cl. 226—14)

This invention pertains to a machine for unloading and loading bottles from their container. More specifically it is directed to a machine for unloading and loading empty and/or filled containers of glass from or into the cases used for transporting about the glass containers. This machine is particularly useful in the dairy and beverage industries.

In any bottling industry, particularly such as a dairy industry, the glass containers make many trips to the consumer and back to the bottling plant in the course of their useful life. On each return to the bottling plant, the glass container must be removed from the case, washed, sterilized, filled, capped and returned to the case. Many of these operations are performed automatically by ingenious mechanical devices and machines but to this date, no single machine has been used successfully in handling diverse size bottles, such as used for instance in the dairy industry.

The dairy industry uses various types of bottles. Most bottles are of the quart size, though there are half gallon, gallon, pint, half pint and several in-between sizes. Most bottles are of the conventional type such as for instance a standard quart size round type bottle whose neck generally flares out to meet the body. Other types are the so called cream neck type in which a bulbous flare-out is provided in the neck portion to provide a chamber for cream to separate out over the milk. Also there are the square body type which terminate in a round neck. Then there are also rectangular bottles generally of half gallon size which also terminate in a round neck. Regardless of the size or shape of the body of the bottle most of them terminate in a round neck having an inside diameter at the head of approximately one and one-fourth inches and an overall outside diameter at the neck uppermost section of about one and three-fourths inches. Immediately below the top there is a small rim or bead which facilitates gripping by the dairy worker and milk delivery man.

The familiar type of beverage containers as used for carbonated drinks, beer and the like all have a lip or bead over which the metallic crown with the cork insert is pressed on. As in the dairy industry carbonated and beer beverage bottles also vary not only in height but also in size. It therefore is clear that any device used must be flexible so that it can be used over a wide range and variety of height and neck sizes.

It therefore is an object of this invention to provide a machine capable of loading and unloading glass bottle containers into or from the bottle cases.

A still further object of my invention is to provide a loading and unloading device for bottles which may be of various neck sizes.

Another object of my invention is to provide a machine that is capable of loading and unloading bottles of different heights.

Another and still further object of this invention is to provide a machine capable of loading and unloading bottles of various shapes provided they have a uniform neck size.

A still further and additional object of my invention is to provide a machine capable of unloading a case in one operation, line up the bottles in a single file and deposit these on a conveyor for further processing.

A still further but not final object of this invention is to provide a device that will pick up from a single conveyor line the number of bottles required to fill the case, break up the selected portion of the line into the desired number of rows having a smaller number of bottles, and then lower the entire quantity of bottles into the case to fill the same in one stroke.

Another additional object of my invention is to provide a machine designed to load and unload cases in sequence and automatically.

These and other objects, variations, adaptations, modifications and extensions will be quite obvious and apparent to those skilled in this art particularly in view of the clear, lucid and definite description given hereinbelow in which the fundamental concepts underlying the principles of my invention are applied in connection with an example of one of the preferred embodiments of this device not as a limitation thereof but purely for illustrative purposes and for the principal reason to provide a better and clearer understanding of the elements involved in my invention.

In connection with the description given below there are annexed hereto and forming a part of this disclosure, a series of drawings illustrating the preferred embodiments of the principles underlying my invention which again are to be construed purely as illustrative and by no means directly or indirectly as limitations thereof. In connection with the illustrations, numerical characters are applied to certain elements shown therein and are used to define and point out more clearly these elements not only thereon but also hereinbelow.

In the drawings Figure 1 is a left elevational, partly in section, view with a case of bottles in position for unloading on the case conveyor.

Figure 2 is a front elevation in section taken partly along line 2—2 of Figure 1.

Figure 3 is a left elevational view showing in phantom the mid position of the bottle carrier in action, and the bottles deposited in single file by the bottle carrier.

Figure 4 is a plan section taken along line 4—4 of Figure 3 partly broken away to show the pivot hook action in aligning the bottle carriers into a single file.

Figure 5 is a plan view of the section taken along line 5—5 of Figure 2 and showing the fully extended bottle carriers in single file.

Figure 6 is a plan view of the case conveyor and a case thereon containing bottles taken along line 6—6 of Figure 1.

Figure 7 is a detail showing the valve trip release mechanism to raise and lower the bottle carrier.

Figure 8 is a detailed drawing showing the bottle release opening trip lever taken along line 8—8 of Figure 5.

Figure 9 is a right elevational view showing the hydraulic valve mechanism to drive the horizontal cylinder piston and other elements.

Figure 10 shows the valve trip arrangement for the horizontal cylinder.

Figure 11 is another position of the valve trip arrangement.

Figure 12 shows a perspective of the valve and the associated trip lever plate.

Figure 13 shows diagrammatically the hydraulic flow circuit.

*The machine in general*

In order to provide a clear and lucid explanation of this machine, the various sub-assemblies and their relation will be briefly described in general language before a detailed explanation is made of the elements comprising the sub-assemblies.

Essentially the device comprises a combination of the sub-assemblies consisting of a case conveyor and its associated case movement controls, a boom to hold a carriage for transporting the bottles from one conveyor to another, a carriage riding on the said boom, a means for picking up and depositing the bottles, a bottle carrier and power means to move the carriage and carrier horizontally and vertically respectively.

Essentially the conveyor sub-assembly consists of a case conveyor, a bottle conveyor, a means to align the case on the case conveyor, a means to place the case in position for action beneath the bottle carrier and a means to release the case. All the elements of this sub-assembly are in juxtaposition with the column supporting the boom and other sub-assemblies in the combination to form this device.

The boom assembly comprises a stiff, rigid structural member extending transversely over the conveyors. Its primary function is to provide a support for the track upon which a carriage rides and a power means for moving the said carriage horizontally over the conveyors and simultaneously operating the bottle row aligning means. The boom also supports the various means to limit movement of not only the horizontal driving power means but also the bottle elevating and lowering power means.

The carriage comprises a structural plate which slides on a bearing arrangement over the track supported by the boom. Above the plate is a power driven means to provide a vertical movement for the bottle carrier assembly and its appurtenant devices. The bottle carrier assembly and its appurtenant devices are suspended beneath the slide or carriage plate from the end of the piston of the elevating means protruding through a hole in the carriage plate.

The bottle carrier and its appurtenant devices move vertically through preselected distances. It comprises a means for a power takeoff from the boom regardless of vertical position of the bottle carrier, a means to form a row or rows of bottles, a means to align said row or rows into a unitary sequence, a bottle gripping means, and a means to open and close said gripper means.

The power takeoff is a rack and pinion arrangement capable of transmitting power only when the carriage is in motion. A stationary rack mounted on the side of the boom is engaged by a gear on the carriage, and as the carriage moves to and fro under the influence of the horizontal driving means thrust, it rotates in one or the other direction. Through the gear is a slidable keyed shaft whose lower end is journaled in the bottle carrier plate. As the latter moves vertically, the shaft moves likewise but since it is slidably keyed with the gear and rack arrangement on the boom, it will be driven whenever the slide or carriage plate moves horizontally. Attached to the lower end of the shaft is another keyed gear which drives the row aligning means suspended beneath the carrier plate.

The row aligning means comprises a selected number of short sections of bottle grippers. Each section carries a preselected number of bottles to correspond with the number in each row in the case. Normally, a quart milk bottle case will have three rows, each row having four bottles. Accordingly, each bottle gripper is designed to carry four bottles and the row aligning means will comprise three sections of grippers, each gripper being capable of carrying four bottles. However, all gripper sections operate as a unit. The gripper sections are so designed as to size that the entire unit will enter the case to grip the bottles therein or will pick up the bottles as they are arranged within the case. Accordingly, if there are four rows of bottles, then there are provided four gripper sections. However, as a matter of convenience, the particular embodiment described in this disclosure is directed to a three row bottle gripping arrangement. These sections are suspended from horizontally extensible slides held by bearings on the carrier plate. The slides have thereon racks which are in contacting juxtaposition with the driver gear located at end of vertically slidable keyed shaft. This shaft is driven by the gear in contact with the stationary rack on the boom. During movement of the said carriage the motion of the gear riding on the boom rack is transmitted to the gear, then the slidable shaft, the driven gear at the bottom of said shaft and finally to the row aligning parallel movable racks on the extensible slides. In the particular embodiment under consideration, the two outside sections moving outwardly have driving racks thereon while the middle section being stationary is suspended from the carrier plate. However, if four sections are used then another carrier head drive can be designed by anyone skilled in this art without any unusual difficulty. As the outside or extendable sections move outwardly in a parallel juxtaposition to each other and to the bottle and case conveyors, each of the bottle grippers are suspended therefrom by two or more swivel arms which move the grippers from beneath the slides and swing them about an angle of ninety degrees to form a single line. On the return stroke this line is broken into individual sections, the said sections pulled in together by means of the extensible slide and racks thereon and formed into a series of parallel rows, each row having the capacity to hold the selected number of bottles to fill the individual row in the case.

The bottle gripping assembly comprises essentially a longitudinal claw-like clamp, having a suitable tensioned spring means to keep the jaws thereof together so as to retain bottles therebetween and a means to spread apart said jaws to release any bottles held therebetween. The clamps are slightly flared at the bottom so that they can be lowered over the heads of the bottles by means of the positive vertically operating means and then snapped tight about the necks of the bottles by the spring.

The power means can be of any suitable type either electrical, mechanical or hydraulic or any combination thereof. However, in this particular adaptation, it is preferred to use a hydraulic cylinder drive since a smooth positive rhythmical action is obtained. In addition, the use of electrical devices under highly humid conditions as found in dairies and bottling plants is a dangerous practice, which has important consideration in the design of this device. Moreover, the particular manner of operating this machine is a matter of choice and therefore it is not limited to any particular power means for clearly anyone familiar with machine design can easily adapt such means to the machine and still come within the spirit of the fundamental concepts underlying the principles of this invention.

*The supporting column, conveyors and appurtenant devices*

Essentially the machine consists of a supporting upright column 20 resting on a footing 24 which extends in the general direction under the boom 22. The boom or carrier beam 22 and the footing 24 are attached to the opposite ends of the said upright column 20 to form an open U shaped structure resting on one of the legs, namely the footing 24.

The upright column 20 may have any cross sectional appearance but for cogent reasons of sanitation and design it is preferred that it have a general rectangular cross section as shown substantially in Figures 4 and 6.

The footing 24 may comprise a plate, channel or any structure of conventional design which will extend in a general parallel direction in relation to the boom 22. It is advantageous to extend the footings under the conveyors and for reasons of rigidity as well as utility that the conveyors be also attached directly to the machine. If need be, the column 20 can be embedded in the floor. However, considerable latitude can be exercised in this respect by conditions and circumstances under actual use in the bottling plants.

The case conveyor 300 consists of a conventional type of conveyor well known and used widely in the material handling industry. It comprises a series of rollers 302 journaled in the usual bearing blocks within the frame channels 304. The conveyor 300 is locked preferably at the desired level to the loading and unloading machine by means of a cut out 306 in the channel 304 adjacent the supporting upright column 20. It can be secured thereto by any other means as desired.

The case 312 whether empty or full is forwarded to the machine either by gravity or power driven rolls 302 forming a part of the conveyor 300 mechanism itself and it is not an element of this invention. As the case is urged onward, the leading edge or corner thereof contacts the case guide rail 314 held by two or more upright rods 316 which are fastened or threaded into a bar 318. The bar 318 may be attached to the transverse supporting bars 308 and 310 extending underneath the conveyor 300 from the supporting upright column 20 to which they are fastened by conventional means and thus are a part of the device for loading and unloading. If desired and as an alternative method of accomplishing the same result, the upright rods 316 can be mounted on the block bar 318, the latter being slidably adjustable on transverse bars 308 and 310. The bars 308 and 310 can be fastened directly to the channels 304 of the conveyor 300 if desired to tie in the column 20 with the conveyors. The case 312 proceeding on the rolls 302 of the conveyor contacts the guide rail 314 and is pushed into position parallel to and against the guard or case positioning rail 322.

In operation, the bottom of the front panel 312a of the case 312 rides over the depressed case stop 324 disposed within the space between the rollers 302. This stop 324 is depressed below the top level of the rollers 302 by means of a lever arrangement 326. The case stop block 324 is fastened to the bar 308 by means of parallel bar arrangement having the short link 328 and a long link 330 pivoted about the pins 332 fastened to the bar 308. By means of the lever arrangement 326, the spring 334 acting on the short arm of lower bell-crank 336 will retain the case stop 324 in an upright position so that the lower inside surface of the rear panel 312b of the case 312 is prevented from forward movement on the conveyor. If, however, the upper bell-crank 338 is pulled forward by the case stop dog pull 340 mounted on the bar 342 attached to the carriage which is moving horizontally away from the column 20, then the force applied to the upper arm of bell-crank 338 is transmitted through the rod 337 to the lower bell-crank 336 to the parallel bar arrangement 326 and the case stop block bar 324 is depressed below the surface of the rollers 302. The upper pivot arm or bell-crank 338 has a roller pin 344 over which the dog pull 340 rides. On the incoming stroke the dog pull 340 swings about the pin 346 behind the carriage supported arm 342. However, on the outward movement the dog pull 340 is prevented from moving by the restraining pin 348 (for detail see Figure 7). The dog pull 340 pulls on the roller pin 344 which in turn depresses the short arm of upper pivot or bell-crank 338 to transmit the motion onwards thru the linkage to the case stop 324. This structure completes the forward movement of the case into position under the boom. When the roller pin 344 is forced beyond the tip of the dog pull 340, then the spring 334 restores the stop 324 to its blocking position.

To position the case 312 longitudinally and also to clamp it during the process of unloading or loading, a case positioning and holding arrangement is provided. This comprises a clamping spring pressure bar 350 held by springs 352 and bolts 354 to a supporting bar 356 mounted across the inside of the arms 360. Both arms are pivoted about the shaft 362 which is journaled into the bars 308 and 310. A lever arm 358 is fixed to shaft 362 or if preferred it can form the extension and become one of the arms 360. This lever arm 358 by means of the horizontal rod 364 and lower bell-crank or pivot 366, vertical rod 367, upper bell-crank or pivot 368 is actuated by the bar 372, Figure 9, forming an extension of the carriage which on its back stroke abuts against the roller pin 370 attached to shorter leg of the upper bell-crank pivoted lever 368. The lower bell-crank 366 and upper pivot lever 368 swing about the pins 365 and 267 respectively. These like the spring 363 exerting a pull on the shorter leg of the bell-crank or pivot lever 366 are attached to the supporting column 20. When pressure is applied by the carriage bar 372, the spring supported pressure bar 350 through the lever arrangement is pushed against the case 312 and holds and positions it against the rail 322 while it is being loaded or unloaded. To provide for easy ingress and egress to the case, the pressure bar 350 is slightly flared at both ends.

The case 312 after unloading or loading is released when the carrier plate is elevated and moved forward from the supporting column 20. When this movement occurs, the bar 372 releases the upper bell-crank 368 and by reason of the spring pressure 363 the movement is transmitted thru lever arrangement to the pressure bar 350 and releases the clamping pressure against case 312 and plate 322. Simultaneously, the case stop 324 is also momentarily depressed to permit onward movement of the case 312 along the conveyor 300. Immediately thereafter another case in contact with case 312 moves over the momentarily depressed case stop bar 324 and is guided in longitudinally by the guide rail 314. This action on the case is repeated at each cycle.

The bottles unloaded from the positioned case 312 are carried over to the single file bottle conveyor 374 by means of the machine. The same conveyor 374 can be used to bring back the filled bottles to place into cases 312 by the reversal of this unloading cycle.

The boom

The boom or carriage supporting beam 22 essentially in its simplest form may consist of two transversely extending parallel slide bars or rods 26 attached to the upright column 20 and on which the vertically acting lifting and carrier mechanism assembly is slidably mounted thereon. However, again for reasons of rigidity and strength and not as a limitation of the spirit of this invention, it is preferred to use the construction described hereinbelow. The boom 22 comprises a series of plates 22a, 22b and 22c which respectively form the left, right and top sides thereof. The left and right sides 22a and 22b are attached to the upper part of the sides of the upright column 20 to form a truss like construction almost completely covered by the plates. To permit the vertically extending hydraulic cylinder freedom to move transversely, a slot 22s is cut in the top plate 22c. To provide additional rigidity to the lower sections of the plates 22a and 22b, longitudinal bars 22e are welded thereto for the entire length. However, if desired, all of these plates and reenforcing bars can be eliminated by use of two L-shaped structural members in which the shorter legs of said members can serve as a slide track 26. It is important that the boom or carriage support beam and track be sufficiently strong to carry out its intended function.

Immediately below and parallel to the said reenforcing edge bars 22e are slide rods or track 26. The slide rods 26 are held at their ends by blocks 28 and a plate 30. These are respectively attached to the sides of the upright column 20, and the forward end of the boom 22. The plate 30 extends across and slightly below the forward ends of the boom plates 22a and 22b. This plate 30 may be in the form of an inverted T whereby it will not only act as a cover plate for the exposed interior of the end of the boom 22 but also act as a supporting plate for the ends of the slide track 26, stationary rack 32 and rack guide bar 34 and other devices attached thereto.

The stationary rack bar 32 and rack guide bar 34 are also aligned below in parallel juxtaposition with the track 26 and with each other as shown in Figure 2. However, if desired, guide bar 34 can be replaced with another rack and idler gear (not shown) arrangement to provide positive engagement to the stationary or driver rack 32 with the shaft driving gear 36. This same result is obtained by a roller 38 on pin 39 which rolls against rack guide bar 34. The gear 36 through a vertically slidable shaft gear train, as explained more fully hereinbelow, actuates a series of racks and pinions driving the extensible slide mechanism for alignment of rows of bottles into a single file or vice versa whenever the carriage moves on the track 26.

The slide plate 50 is moved horizontally to and fro by means of a horizontally disposed hydraulic cylinder 40 fastened to the rear wall of the supporting upright column 20 by any suitable means such as a threaded bushing arrangement 42. A hole 46 cut through the front wall of column 20 permits the piston rod 44 to travel and connect with the carriage slide plate 50 by means of the clevis 48.

It should be noted that the piston rod 44 is directly behind the slide rod 26 and therefore cannot be seen in the elevational views in the illustrations but Figure 4 will clearly show its position in the assembly.

The stroke of the piston rod 44 is limited by the carriage slide plate 50 butting against the end plate 30 and on its return by the stop 49 which can be adjustably threaded into the nut 51 attached to the outer surface of the front wall of the supporting column 20. There are many obvious modifications of the stroke limits but the above is simple and foolproof.

*The carriage mechanism*

The carriage comprises a slide plate 50 suspended from the slide rods 26 by means of bearing blocks 52 attached to said plate and slidably mounted on said rods 26. The longitudinal edges of said slide plate 50 ride respectively between the track 26 and the stationary rack 32 and its corresponding guide 34 to provide greater stability and rigidity during the operation of the machine. Centrally located within the plate 50 is a bushing 53 through which the vertical hydraulic cylinder 54 is inserted and held in an upright position. The piston rod 56 protrudes below the bushing 53 and on its end is suspended the bottle carrier mechanism plate 60 which moves vertically under the control of the piston rod 56.

*Bottle carrier assembly*

The bottle carrier assembly comprises a plate 60 depending from the end of the piston rod 56, a means to drive the row spreading and gathering device or the extensible slides and the means to spread or gather bottles in the gripper sections into desired number of rows, each row carrying a preselected number of bottles held by the bottle gripping claws.

On the carriage plate 50 and on the bottle carrier plate 60 are two bearings 61 and 63 respectively in which is journaled the long vertical shaft 62. A long narrow keyway 64 is slotted longitudinally in the surface of said shaft 62 to which the gear 36 is keyed by the key 66 (see Figure 4 for detail). The rack 32 is in contacting juxtaposition with the teeth of the gear 36 keyed to the shaft 62 with the result that the shaft 62 is driven when there is any horizontal movement of the carriage plate 50. When the bottle carrier plate 60 is lowered by means of the vertical hydraulic cylinder piston rod 56, the shaft 62 would still rotate regardless of position of gear 36 thereon if there is any horizontal movement of the carriage plate 50. The lower end of the shaft 62 protrudes thru the bushing 61 and beyond the bottom of the bottle carrier plate 60. Suspended on its end is a gear 68 which is keyed thereto and turns as the shaft 62 is driven by the gear 36. The gear 68 drives the racks that spread or gather the extensible slides.

To assist the bottle carrier plate 60 and its appurtenant devices to stay in vertical alignment, rigidity in movement, vertical guide bars 58 are attached to the top surface of the plate 60. The bars 58 slide in a bearing plate arrangement 59 forming a slot 57 in which the bars 58 are guided. The bearing plates 59, if desired, can be integral parts of the arms 342 and 372 that actuate the case stop 324 and case holding press bar 350 respectively.

*The row aligning assembly*

The row aligning mechanism comprises the means suspended below the carrier plate 60 and comprise the driving gear 68, the extensible parallel slides that have the racks 70a and 70b driven by the gear 68, bearings to support the said slide racks, a pivoted hook arm to swing about the bottle grippers into a single file and a spring to return the grippers into a multiple row assembly upon retraction of the slide plate 50.

The bottle carrier assembly plate 60 is suspended from the end of the upright piston rod 56. The long slotted keyway shaft 62 journaled in bearings 61 and 63 on plates 50 and 60 respectively terminates below the carrier plate 60 into a pinion gear 68 that drives the left and right hand spreading and gathering movable slide racks 70a and 70b respectively. The extensible slides on which the movable racks 70a and 70b are mounted run in bearing blocks 72 which are fastened to the under side of the bottle carrier assembly plate 60. As the slide plate 50 moves horizontally on the track 26, the stationary rack 32 drives the horizontally moving gear 36 mounted on plate 50 and which rotates the long shaft 62 together with the movable rack driving gear 68 located below the bottle carrier assembly plate 60. Since both movable racks 70a and 70b mounted on the extensible slides are in engagement with the gear 68 they are either driven outwardly or inwardly depending on the action of the horizontal hydraulic piston rod 42 on the slide plate 50. Suspended from each of the extensible slide racks 70a and 70b on pins 76 are bottle carrier swivel arms 74a and 74b. From the ends of said swivel arms 74 are suspended bottle gripper mechanism sections or carriers 82 by means of pins 78. The swivels 74a are of the jack knife type in which a hooked arm 75 engages a bottle gripper section swing out pin 84 upon which is mounted a roller to decrease wear and tear. As the racks 70a and 70b move outwardly under the influence of the pinion gear 68, the hook arm 75 after engaging the bottle gripper section swing out pin 84, forces the bottle gripper sections 82 to move out from under the extensible slide racks 70 and swing about the pins 76 through an angle of about 90 degrees until at the end of the stroke, the sections 82 are in a single file alignment ready for descent onto the single file bottle conveyor 374.

Upon the completion of the descent and ascent of the bottle gripping or clamping sections 82, the horizontal piston rod 44 is set into a rearward motion by the controls which will be described fully hereinbelow. The extensible slide racks 70 move simultaneously with the motion of the carriage plate 50 into retracting positions adjacent each other beneath the bottle carrier plate 60. In the initial phase of the retractive movement, the sections 82 are permitted to swing back under their respective racks 70 because of the pressure applied by means of the helical springs 80 wound around pins 78 and acting on the swivels 74 as soon as the hook arm 75 is returned beyond the roller on the swing out pin 84.

When this occurs, the gripper sections 82 are now under the slidable racks 70 and the latter are ready for assembly into case acting position beneath the carrier plate 60. This action is completed by the time the return stroke of the horizontal piston rod 44 is made and occurs generally when the plate 50 is in contact with stop 49 mounted on the front wall of the supporting column 20.

The carrier plate 60 and gripper sections 82 are now in position for descent into the case 312.

It should be noted that the carrier plate 60 may have as many extensible slide racks 70 as needed. If for instance there are needed four sections, one for each row of bottles in the case, then four slide racks will be provided. A suitable change in the drive gear 68 and ratios can always be made by one skilled in this art and therefore it is not necessary to describe this obvious modification of the principles underlying this invention.

In the embodiment used as an example only two extensible slide racks 70 are shown, each carrying a bottle gripping section 82. The third section 82c is obviously stationary and is suspended below the carrier plate 60 by suitable means.

The bottle gripper mechanism

Essentially the bottle gripper or clamping device sections 82 comprise longitudinal bifurcated clamping claws or tongs capable of acting on one or more bottles of same size at one time, a spring means to keep the said longitudinal claws in a closed position, and a means to open the said longitudinal claws and to hold the same in this position for a preselected unit of time or for a preselected space of travel of both horizontal and vertical movable means.

The longitudinal bifurcated bottle clamping or gripping jaws comprise two sets of bifurcated freely movable tongs 90 suspended from each end of the rods 88 protruding through a common bearing block 86. The bearing blocks 86 are suspended from the pins 78 located at the end of the swivel arms 74 attached to the movable parallel slide racks 70. The lower end of each tong arm 90a is turned inwardly to face a similarly disposed angle on the coacting tong arm 90b and to form therebetween a flared section 92. The upper part of the flared section 92 on each of the arms is a knife edge 94. Bar 96 extending from one of movable tong arms 90a to the same arm on other pair of tongs on a common rod 88a is attached to the inner surfaces of ends of said tongs to form thereon an extension of the said knife edge 94 and a flare 92 between the two individual tong arms that are longitudinally adjacent. It is essentially a longitudinal tong arm coacting with the other arm of similar construction and facing each other so that the bead 100 on the neck of the bottle 102 is held by the knife edge 94 of the bar 96 as shown in the Figures 3 and 9.

The bars 96 are made of metal but if desired these can be made of any suitable material such as hard rubber, certain plastics or the like, or the metal may be rubber coated to prevent not only slippage of the bottle 102 but also to prevent nicking and chipping of the head 100 or of the neck of the bottle while the machine is in action.

The longitudinal bar tongs 96 are forced to remain in a closed face to face position under the urging of the flat spring means 98 which is supported at upper end by the central rod 88c. A cam rod 104 is supported by the bar 106 hanging from the common rod 88c journaled at both ends in the bearing block support 86. The cam rod 104 lies in the same horizontal plane as the tie rods 110 which tie together the midsections of the tong arms 90a or 90b suspended from a common rod 88a or 88b respectively. Likewise, it lies in the same perpendicular plane as the center rod 88c journaled in the blocks 86, so that it is not seen on the drawings except as a little stub beyond the tong arms in Figure 2. The spring 98 has extending leaf like arms 98a and 98b which rest respectively on the outside of the cross bars 96a and 96b between the movable tong arms on a common rod 88a or 88b and force the said bars 96a and 96b into a closed position.

As described above the tie cross rods 110 tying the midsection of the tong arms suspended from the common rod 88a or 88b together lie in the same plane as the cam shaft 104. A cam 112 is located on the said cam rod or shaft 104 in such a position that the narrower section thereof lies between the cross rods 110 and the wider portion thereof when horizontally disposed contacts the rods 110 and in turn spreads apart the tong bars 96. The cam 112 is held in position on the cam rod 104 by means of a set screw 114. For instance, in the detailed drawing of Figure 8, the cam 112 is shown in free position whereby the tong bars 96 are in a clamping juxtaposition.

Attached to the cam rod 104 at desired positions are closing and opening trip levers 116 and 118 respectively. Each bottle carrying section 82 has a set of closing and opening trip levers. These are tripped shut by roller pins disposed in preselected position as the bottle carrier assembly plate 60 is lowered over the case conveyor 300 and tripped open by another set of roller pins as it is lowered over the single file conveyor so that the bottles held in the jaws can be released and dropped on the single file conveyor 374. However, by changing the position of the cam or the trip levers on the rod, the same means can be used to pick up bottles from the single file conveyor 374, rearrange the picked up single row into a preselected number of rows, each row having the desired number of bottles and then discharging the entire load at one time to fill the case 312 on the conveyor 300. This change can readily be made by one skilled in this art and there is no need for a detailed explanation of the same at this point.

The trip lever 116 in the unloading cycle is acted on by means of pins 120, Figures 1 and 9, mounted in the bar 122 extending transversely over the case conveyor 300 and attached to the supporting column 20 by means of a supporting L shaped member 124 at a height to clear the top of the case 312. As shown in Figure 9, the trip lever 116 is in the up position indicating that the pins 120 on the bar 122 have closed them and thus snapped the claws over the necks of the bottles. These have picked up the bottles and are now ascending in the direction of the arrow. As indicated previously there is a trip and pin or roller for each section of grippers. If desired, rollers (not shown) can be mounted on the pins 120 for smoother operation. Incidentally, the height of the bar 122 can be adjusted if the height of the cases 312 should vary as between quart and pint bottle cases.

The entire trip assembly on the forward end of the machine is carried on the plate 140 that depends from the end plate 30 by means of a vertically adjustable rod 130. The plate 140 has the required number of extension arms 128 (three in the present embodiment as illustrated) which support the trip opening rollers 126 that act on the trips 118. These extension arms 128 have therein a longitudinal slot 132 in which the pin (or shaft) of the roller 126 is adjustably set at the desired horizontal distance so as to encounter the trip 118 and effectuate the change in its position on the cam as the carrier mechanism descends. The conventional threaded stud and nut arrangement is used to fix the position of the roller but any other well known means can be used also.

The upper part of rod 130 has threads 134 thereon which are engageable within the sleeve 136. The latter is fastened to an extension plate on the bottom of the end plate 30. A knurled cap nut 138 is placed on the top of the rod 130 to facilitate the vertical adjustment of the plate 140. Two or more guide pins 131 are used to maintain vertical alignment and impart rigidity to the suspended plate 140 which carries the trip rollers 126.

The control mechanism

Two independent control circuits are provided. One circuit operates the vertical movement and the means to accomplish the same; the second circuit operates the horizontal movement of the carriage and its appurtenant means to execute it.

The vertical means comprises a limiting control for the descent of the carrier and also a limiting control for its ascent. These controls are operable either at the front or the rear of the boom depending on the position of the slide carriage plate 50.

Attached to the left side of the slide carriage plate 50 is an arm bar 342 which not only has on its rearmost end the dog 340 to control the case stop 324 but also has thereon a snap button plate 200. The plate 200 acts as a sleeve for a release pin 202, Figure 7, which is customarily held in an upward position by means of a spring 204 acting on the head of the pin 202 and resting on the upward surface of the extension arm of said plate 200. A slot 206 is formed in the side of said extension through which a ball pointed slide pin 208 protrudes and which is fastened into a hole in the upper part of the pin 202. Thus when the head of the pin 202 is depressed as by rod 210 the slide pin 208 is also pushed down and releases the valve trip plate 250 thereby permitting the ball slide pin 208 to fall into the pocket or recess 252. When this occurs, the cycle is reversed and the carrier assembly plate 60 is raised. The ball slide pin 208 remains in the said recess 252 until the carriage slide 50 moves forwardly and out of contact of the valve trip plate 250. The latter under the influence of the spring 254 fastened to the top of the plate 250 and to the plate of the boom 22, is restored to a neutral or hold position.

Mounted slidably alongside the pin 202 within the sleeve of the plate 200 is a push down rod 210. The lower end of this rod is fastened to the bottle carrier plate 60 while up on its upper end is a catch 212 which impinges on the top of the release pin 202 as the carrier plate 60 is lowered. A somewhat similar arrangement is provided on the forward end of the boom 22 so that the vertical movement cycle can take place there when the carriage plate 50 is at the forward end. This arrangement comprises a plate 214 having a ball slide pin 208, a slot therefor 206, a spring 204 and release pin 202. Upon reaching the forward end of the boom, the pin 208 pushes a lever 216, Figure 1, attached to the end of the boom 22 by means of a bracket 218 which acts on the valve trip plate 250 through the lever arrangement 220 fastened to the side plate of boom 22. This will reverse the trip valve plate and cause immediately the descent of the carrier plate 60. In order to release and stop the downward movement, another push down rod 222 is provided. This rod 222 is slidably engaged by a suitable bearing plate attached to the end of the boom 22. The bottom of the rod 222 has an annular recess 223 which is engaged by the bifurcated catch 225 attached to the top of the carrier plate 60. As the plate 60 descends it carries down the rod 222. On the top of this rod 222 is a valve trip 212 that contacts the pin 202 and this trip forces the ball pin 208 into a recess 224, on the end of valve trip 216. When this occurs, the motion is stopped and reversed until the carrier assembly plate 60 reaches the boom and the carriage slides to the rear. When this occurs, the pin 208 comes out of the recess 224 and the entire valve trip plate lever arrangement comes to a neutral position under the urging of the spring 254. The above cycle is completed and then repeated as long as necessary.

The horizontal movement is also controlled by two trip like circuits. These are best shown in Figures 9, 10 and 11. Figure 9 shows the carrier in the ascending position. When the piston rod 56 reaches the top of the stroke, a trip dog 226 mounted on pin 228 attached to the end of the rearmost rack slide bearing block 72 forces upwardly the inverted T valve control plate 256. This plate 256 rotates on a pin 258 which is attached to the side of the supporting column 20. At the upper part of the vertical leg of the T is another pin 260 to which the long horizontal rod 230 is attached. A simple detent 262, seen better in Figures 10 and 11, is provided in the long arm of the valve control plate 256 to fit into a series of holes 263 and to limit its travel. Likewise, if necessary, a turnbuckle arrangement (not shown) can be provided on the long horizontal rod 230 to shorten or lengthen the stroke. On the side of forward shorter arm of the inverted T valve control plate 256, a roller 264 is provided over which the dog 226 can ride. The two short arms 256a and 256b are in the form of horizontal plates that operate four valves, two valves at one time on each contact as it will be explained in detail below.

The other end of the horizontal rod 230 is attached by pin and clevis arrangement 232 which also can provide a certain amount of control as to the length of the stroke since the end of the rod 230 is threaded to fit within the clevis nut. The clevis 232 is attached to the long arm of a bell-crank 234, while the shorter arm thereof has mounted thereon roller 236 upon which the dog 240 mounted on the carrier plate 60 rides over or acts thereon. The bell-crank 234 swings about the pin 238 attached to the side of end plate 30. The dog 240 mounted on the carrier assembly plate 60 swivels about its pin 242. The latter is attached to an elevation block 244 which is attached to the top of the carrier plate 60. On the completion of the forward stroke, the dog 240 contacts the roller 236 as shown in phantom in Figure 9 forces the pivot lever 234 to move the rod 230 to the rear and down about the pin 258 so that the plate arm 256b presses down on the special valve arrangement. But since this is the same position as at the beginning of the stroke, the horizontal piston rod 44 is maintained in same position. By means of the vertical control arrangement described previously, the carrier assembly plate 60 is lowered as shown more fully in Figure 10. On the upward stroke of the vertical piston rod 56, the dog 240 on the carrier plate 60 pushes up the smaller arm of the bell-crank 234, pulls forward the rod 230 and the long arm of valve control plate 256 which swivels about the pin 258 and the arm with the roller 256a now engages the other set of valves that initiate the rearward stroke of the horizontal piston rod 44. Thus the cycle is repeated over and over until the source of power is shut off.

*The hydraulic drive circuit*

Though as stated previously any type of motive power can be used, it is preferred as illustrated in the preferred embodiment of this invention to use a hydraulic driving means. The diagramatic representation of this drive as shown in Figure 13 is typical but obviously it can be varied and still come within the principles underlying the spirit of this invention.

The fluid pump 400 circulates the fluid such as oil throughout the entire system and maintains it generally at a pressure of about 100 to 125 pounds per square inch. A relief valve 402 set at the desired pressure level is in the line in case the machine should get jammed, and the excess oil will flow back in the fluid sump well 404. The fluid under pressure is supplied to both the horizontal as well as the vertical actuating means by means of T 406 in the pipe line 408. The flow will for convenience be followed through the vertical actuating circuit first and then later through the horizontal actuating circuit.

In the vertical circuit, the fluid under pressure is stopped at the pressure valve 452 positioned in the top of the common valve block 450. Immediately below this valve in the same block is a discharge valve 454. Both valves have access to a common duct 456 bored in the block which in turn is directly connected by means of flexible tubing 458 to the vertical hydraulic cylinder 54. The valve trip plate 250 when properly energized pushes down the pressure valve 452 while the discharge valve 454 is allowed to remain closed. The open pressure valve 452 permits the fluid under pressure to enter the common duct 456 and since the discharge 454 is closed it will follow through the flexible hose 458 attached to the bottom of the vertical hydraulic cylinder 54 and actuates the piston rod 56 in an upward stroke. To relieve any back pressure over the piston 56 there is provided in the upper part of the cylinder 54 a return or vent pipe 460 which is attached to the upper part of the cylinder so that any excess oil seeping through may drop back into the sump well 404. Upon the completion of the upward stroke of the vertical piston 56, the pressure valve is maintained open by the controls so that it will support the load suspended from the end of the piston rod 56 and any excess fluid pressure is relieved by the pressure release valve 402.

However, when the vertical stroke is completed, the carriage 50 actuates the inverted T plate 256 as described hereinabove and the horizontal cylinder is actuated by means of the valve arrangement shown more clearly in Figure 12 which will be described more fully after the vertical movement description is completed. On completion of the forward horizontal stroke, the trip arrangement at the end of the boom is actuated and the pressure valve 452 is closed while simultaneously the discharge valve 454 is opened. The fluid in the flexible hose 458 as well as in the cylinder 54 is now forced by the weight of the load depending from the end of the rod 56 through the discharge valve 454 into the return pipe 460 and to the sump well 404. This action completes the cycle of the flow of the fluid in the vertical circuit. The cycle repeats itself as directed by the controls on the vertical circuit.

The horizontal cycle also receives its fluid under pressure from the pump 402 through the line 408. However, since the horizontal cylinder 40 is of the double acting type it will require two sets of valves. Each set consists of a pressure valve and a discharge valve acting in concert. However both sets of valves are housed in a common valve block 480. It is assumed that the horizontal drive controls have now energized the valves for a forward thrust and therefore the fluid under pressure is applied to the back of the piston rod 44 or at the rear of the cylinder 40. The pressure valve 482a is opened by the plate trip 256 which simultaneously also opens discharge valve 482b. The latter valve (482b) permits the fluid before the piston to escape through it and back to the sump well 404, while the piston rod 44 is urged forwardly by the fluid under pressure supplied thru valve 482a. At the completion of the forward drive of the horizontal rod, the pressure is still maintained until the carrier plate 60 descends. When this occurs, the dog 240 on the carrier plate 60 falls down and on the ascending stroke the dog 240 engages the trip lever arrangement that reverses the position of the inverted T valve control plate 256. The pressure valve 484a and discharge valve 484b are simultaneously opened. The fluid under pressure enters the front end of the cylinder through the open pressure valve 484a while the fluid from the rear end of the cylinder 40 and ahead of the piston is forced out through the discharge valve 484b back to the sump well 404. On the completion of this rearward stroke the conditions remain the same until the carrier plate 60 descends below the roller 264 on the arm 256a of the valve trip.

The cycle described above is thus repeated as long as the controls call for it.

Between the valves 482a and 484b is a common duct 486 that opens into a common line 488 entering the rear of the cylinder 40. Likewise between the valves 482b and 484a there is a common duct 490 opening into a joint pipe line 492 which leads to the front end of the cylinder 40. There is a common duct within the block 480 for both pressure valves 482a and 484a and a common duct for the discharge thru the discharge valves 482b and 484b. Obviously only one pressure line 408 enters the block 480 and only one discharge line 494 leaves the said block to carry the fluid to the sump well 404.

Another variation of the container carrying or engaging means can be provided by substituting therefore a set of electromagnetic pickups that are mounted below the swing-out racks. These would replace the grippers and by a properly designed electrical circuit would pick and release the containers that would have thereon a magnetically coacting material caps such as used on salad dressing jars, canned products or the like. Though this is a variation of the gripper head it nevertheless comes within the spirit of this invention since the basic design of the racks swinging out to form a preselected group pattern suitable for dropping into the cases is utilized with a magnetic pickup.

Though the above description is applied to the preferred embodiment of this invention, it is very clear and self-evident that there are many adaptations, variations, modifications and extensions of the above which a person skilled in the design of machines can develop readily once having an insight into the fundamental concepts underlying this invention. It therefore is not intended that the above description of the preferred embodiment be considered as limitation of this invention but only as an illustrative example of a particular adaptation of the principles underlying this invention and as being only a part of and within the scope of this invention as defined by the hereunto appended claims.

I claim:

1. A device for loading and unloading containers from or into the opening of a case therefor comprising a means for advancing the case in an upright position to a predetermined site for further action thereon; a means to lock the said case there during the process of loading and unloading; a means to release the said locked case after it has been acted on; a means to engage the containers or deposit the same in the opening of the said upright case or on a container conveyor; a means to raise and lower said container engaging means; a means to move transversely the said means to raise and lower the said container engaging means; a means to support said transversely movable means; a means in coacting juxtaposition with the said container engaging means with the said vertical movement means and with the said transverse movement means, to rearrange said engaged containers into a preselected group pattern; the said means to rearrange said engaged containers into a preselected group pattern comprising a means to engage one section of containers in a pattern group, and a second means to engage another section within said pattern group and a means to move the said engaged sections laterally and longitudinally in relation to each other to produce another group pattern; the said means to form said patterns comprising at least two extensible arms movable in relation to each other; a means to shut or open the said container engaging means; a means to control in a preselected sequence the motion of the said transverse movement means and the said vertical movement means; a power means to accomplish the motion of said vertical and said transverse movement means; a means to distribute the said power means during the action of the said means controlling the preselected motion of said vertical and said transverse movement means; and a means to remove the discharged containers arranged into a preselected group pattern or to return the same in such preselected group pattern to the device, whereby containers may be removed from the opening in the case in one stroke, rearranged into a single file for placement on a single file conveyor means during the process of unloading and whereby containers coming in a single file can be engaged by this device, rearranged into a grouping suitable for case loading and discharged therein by this device, in one stroke.

2. In the device of claim 1, and in combination therewith, the sub-assembly comprising a conveyor means for the cases, a guide means on said conveyor to cause approximate positioning of said case, a case engaging means to stop or release the said case beneath the container engaging means, a means to lock or release and accurately station the said case beneath the said container engaging means, and individual means to control the movement of said case stop means and of said case lock means respectively, whereby the cases can be engaged or released in a pre-selected manner.

3. In the sub-assembly of claim 2, wherein the said case engaging means comprises a vertically movable stop block positioned between the rollers of said conveyor, a means to hold the said stop block in a position above the surface plane of the said rollers, a parallel lever arrangement attached to said block and support for the said conveyor means to move said block in parallel relation to said surface plane of the rollers, a lever arrangement to transmit motion from a slidable carriage carrying the container engaging means to the said parallel lever arrangement, a dog catch mounted below and on the rear end of said slidable carriage adapted to slide over a roller on end of said lever arrangement on back movement but on the forward movement of said carriage to catch the end of said lever arrangement until the said lever arrangement is depressed below the dog tooth's lowermost edge, whereby the said stop block is momentarily depressed for a sufficient length of time to release the engaged case which under urging of cases behind it moves out of the sphere of action of said stop block, and to permit the leading edge of the following case to ride over the said depressed stop block.

4. In the sub-assembly of claim 2, wherein the said case locking and stationing means comprises a stationary bar mounted above the edge of the said conveyor and in juxtaposition with the said guide means and said case stop means, a movable bar mounted horizontally in plane parallel to said conveyor and about in horizontal line with said stationary bar, two or more upright pivoted bars supporting the said movable bar, the said movable bar mounted loosely and transversely across the said upright pivoted bars, a spring means on upper ends of said upright pivoted bars to exert pressure against the said transverse bar, and indirectly against side of the case, a lever arrangement in juxtaposition with the said upright pivoted bar and the end of a slidable carriage carrying the container engaging means to transmit motion from said carriage to the said movable horizontal bar whereby the case is held fixedly and stationed accurately against the said stationary bar when the slidable carriage is in the position over the opening in the case, and a means to release the case when the slidable carriage is in another position, whereby the said case can be removed from the sphere of action by the case conveyor.

5. In the device of claim 1, wherein the said means to engage all of the containers within the case consists of a sub-assembly comprising one or more container gripping sections depending on the number of rows of containers in the case, each of said section capable of gripping the total number of containers in a single row within the case and all of said sections acting in concert whereby the case can be loaded or unloaded in one stroke, each of the said sections suspended from a carrier plate, the said sections engaging the outer rows within the case are suspended under movable slide racks supported by said carrier plate, while the section engaging the central row only fixedly suspended from said carrier plate, the said section consisting of two or more pairs of movable claws mounted in parallel sidewise juxtaposition, a jaw on end of each of said claws in a flaring face to face relationship, a knife edge on upper part of said jaw, a transverse bar connecting each of said jaws to another in the same vertical plane to form therebetween a longitudinal knife edge and facing a similar longitudinal knife edge on the opposing jaws of the said claws, a means to maintain said longitudinal knife edge in a closed relationship whereby the said knife edges can engage the projecting perimeter above the center of gravity of the containers, a means to open said knife edges and maintain them in said position, and a means to close said knife edges.

6. In the sub-assembly of claim 5, and whenever there is an even number of rows within the case, the said sections are all suspended under said movable slide racks.

7. In the section assembly of claim 5, each of said sections having an upper transverse rod, end blocks on said transverse rod, swivel pins mounted on top of said end blocks, the said end blocks suspended under the mechanism of said movable slide racks or to the carrier plate, two or more pairs of claws depending from said rod, a transverse bar connecting the inside surface of each claw to the inside of similarly disposed adjacent claw to form therebetween a flared extension of the said knife edges, a spring means mounted on said transverse rod, the ends of said spring means acting on the said transverse bar to keep said knife edges on said claws in a closed face to face relationship.

8. In the assembly of claim 7, wherein the means to open said claws comprise a transverse reenforcing rods mounted substantially about the mid-point of each row of claw arms, a means to spread apart the said claws, and in contacting juxtaposition with the said reenforcing rod, a support for said spreading apart means depending centrally from the said end blocks and between said reenforcing bars, a closing trip bar and opening trip bar in juxtaposition mounted on said support.

9. In the sub-assembly of claim 8, the said means to spread apart the claws is a cam, the said cam mounted fixedly on a shaft, the said shaft having thereon the said opening trip and said closing trip mounted in proper juxtaposition whereby the cam can be twisted about either to spread or release the spread of said claws when the said trips are acted upon and a means to support said shaft from the end blocks.

10. In the assembly of claim 5, wherein the said transverse bar is a moulded cavity, the said cavity split into two sections, the said sections in face to face relationship, and of such contour to adapt the same to being capable of engaging the contoured section of the container.

11. In the device of claim 1, the sub-assembly for the means to raise and lower said container engaging means, comprising a control means to stop or start vertical movement, a hydraulic power means to move vertically the said container engaging means, a slidable carriage on which is mounted the said hydraulic power means, an aperture centrally situated in said slidable carriage and through which protrudes the piston rod of said hydraulic power means, a depending carrier plate suspended from end of said piston rod, and the container engaging means suspended from said carrier plate.

12. In the sub-assembly of claim 11, the said means to control the stop and go movement comprises a pressure hydraulic valve to permit fluid under pressure to enter the bottom of said hydraulic power means and below said piston rod, a discharge valve to release the oil under pressure in the said hydraulic power means to a sump well for recirculation, a valve trip lever arrangement to open and close said valves in proper sequence, a means on the slidable carriage to open said discharge valve at the end of the forward and at the end of the return movement of the said carriage to permit the said carrier assembly mechanism to drop under the influence of gravity to the desired level, and a means to open said pressure valve when the desired lower level is reached and to maintain said pressure valve in an open position whereby the carrier plate is normally maintained in a retracted position.

13. In the assembly of claim 11, wherein the said means on said slidable carriage to open said discharge valve comprises essentially a rod extending vertically and slidably engaged by a guide bushing, the said guide bushing mounted on a plate attached to the edge of the carriage, the lower end of said rod attached to the top of the carrier plate, the upper end of said rod having thereon an overhanging plate to impinge on a release button, a release button slidably engaged by another section of said bushing plate, the said button having a side arm extending laterally and in line with the lower end of valve trip lever arrangement, a vertical slot in edge of said bushing plate to permit the protrusion of said side arm, a spring acting on the head of said release button to maintain the same constantly in an upward position, whereby the said button when depressed by the overhanging plate will cause the said side arm extension to drop below the valve trip lever arrangement, close the discharge valve, open the pressure valve to supply fluid to the said hydraulic power means and elevate the carrier plate in position beneath the slidable carriage.

14. In the sub-assembly of claim 13, wherein the said slidable vertical rod and said bushing plate are attached to the side of the boom, a bifurcated detent attached to the top of said carrier in engaging juxtaposition with the bottom of said vertical rod, and an annular recessed catch on bottom of said rod into which the said bifurcated detent is inserted when the carriage is horizontally moved to either end of the boom.

15. In the sub-assembly of claim 13, wherein the said overhanging plate is adjustable vertically and comprising threads on the upper part of said rod, a threaded bushing in engaging juxtaposition with the said upper end threads and an overhanging bar attached to said threaded bushing.

16. In the sub-assembly of claim 13 and on the forward end of the boom in combination therewith, a depending rod slidably engaged by a bushing plate, the said plate attached to the forward end of the said boom, a slot in side of said plate, an extension arm protruding from said slot in contacting juxtaposition with a valve trip lever arrangement, a pin mounted slidably through said bushing plate and having thereon the said extension arm, a spring to keep said pin in an upward position, an overhanging plate overlying said pin and attached to the top of said slidable rod, the lower end of said rod having therein an annular recess, and a bifurcated catch attached to the top of the carrier plate in horizontal alignment with the said annular recess on end of said slidable rod, whereby the bifurcated catch engages the said rod and pulls it downwardly as the carrier plate to which the catch is attached is moved downwardly in the discharge of its contents onto a single file container conveyor.

17. In the device of claim 1, the sub-assembly for the means to move transversely the said means to raise and lower the said container engaging means and the various appurtenant assemblies cooperating therewith comprising a boom extending transversely across the means for advancing cases and the said means to deposit containers thereon, an upright column to support on its top one end of said boom, a footing attached to the bottom of said upright supporting column, a track to carry thereon a slidable carriage under said boom, a stationary rack in parallel juxtaposition with said track, a hydraulic power means attached to said upper end of the supporting column and in horizontal line with the slidable carriage carried on said track, a freely movable piston rod extending through said column from said power means, a means to join said carriage and said hydraulic power means, piston rod, and a means to control the horizontal movement automatically.

18. In the assembly of claim 17, wherein the means to control horizontal movement comprise stops for the slidable carriage at the forward end and at the rear end of said boom, a lever arrangement to act on a four way hydraulic valve plate, a four way valve plate trip in coacting juxtaposition with a four way hydraulic valve, a four way hydraulic valve, and a means to actuate said lever arrangement in the proper sequence mounted at the forward end and at the back end of the said boom.

19. In the assembly of claim 18, wherein the said stops are horizontally adjustable whereby the distance of travel of said slidable carriage can be varied.

20. In the assembly of claim 18, wherein the said horizontal rod members of said lever arrangement have means thereon to adjust the length of stroke of said piston rod.

21. In the assembly of claim 18, wherein the said four way valve trip plate comprises a plate, an arm extending centrally therefrom to join the end of said lever arrangement, a fulcrum at the junction of said plate and said extending arm, the said plate in coacting juxtaposition with the projecting valve needles in said valve, one half of said plate capable of contacting and depressing simultaneously two projecting valve needles, whereby one discharge port and one pressure port are simultaneously opened in the horizontal power means in a cooperating relationship to permit the fluid in path of the advancing piston to escape and the fluid under pressure to enter the said hydraulic power means.

22. The assembly in claim 1, for the means to rearrange said engaged containers into a preselected group pattern in coacting juxtaposition with the said container engaging means, with the said vertical movement means, and with the said transverse movement means, comprising a gear rack mounted on the edge of the boom extending transversely across the conveyor means for the cases and for the container, a slidable carriage, a gear on said slidable carriage in contacting engagement with said gear rack, a shaft slidably keyed to said gear and journaled slidably to the horizontally slidable carriage, a carrier plate for the means to form the preselected group pattern and for the container engaging means, the said slidable shaft journaled in the said carrier plate and extending below it, a gear on end of said shaft below the carrier plate, slide bearing blocks attached to the bottom of said carrier plate, slide extension arms engaged slidably by said bearing blocks, the said slide extension arms extending outwardly from beneath said carrier plate in parallel juxtaposition with each other and with the said conveyor means for cases and for containers, gear racks attached to said slide extension arms in contacting engagement with the said gear suspended below said carrier plate, a swing out means suspended below said extensible arms for swing out and support of the said container engaging means, and a means coacting on said swing out and support means for the container engaging means to retract the same whereby the container engaging means are swung out from underneath the carrier plate into a preselected group pattern, permitted to deposit or pick up the containers and reassemble again beneath the said carrier plate for further action on the opening in the said case on the case conveyor.

23. In the sub-assembly of claim 22, and in parallel relation to the said rack and said gear mounted respectively on the said boom and said carriage, an idler gear and a corresponding gear rack mounted on other side of said boom and said carriage in facing relationship to the said first gear rack and gear whereby the carriage plate runs more smoothly on the track and the driven gear is in positive engagement with complementary gear rack.

24. In the sub-assembly of claim 22, wherein the said racks are integral elements of said extensible slides.

25. In the sub-assembly of claim 22, the said swing out means comprise pins depending in preselected positions from the bottom of said extensible slides for sustaining a parallel bar lever arrangement, ends of said parallel bar lever arrangement attached to said depending pins, the other ends thereof supporting the container engaging means, a bell-crank lever suspended from inner end of said extensible slide, one arm thereof attached to said parallel bar arrangement, the free arm of said bell-crank extending beyond edge of said extensible slide arm, a swing-out pin depending from the bottom of said carrier plate in proximity to the edge of said extensible slide arm whereby when the said extensible slide moves by, the free arm of said bell-crank is engaged by the said swing out pin, and the parallel bar lever arrangement swings 26. In the assembly of claim 22, wherein the said means for retracting the swing out container engaging means is a helical spring acting on the said swing out and supporting means.

27. In the assembly of claim 22, wherein the said means for retracting the swing out container engaging sections beneath the slides, is a spring, one end of said spring attached to the said slide, and the other end thereof attached to the said container engaging means.

28. A machine for loading and unloading bottles into or from a case, comprising a case conveyor, a rail guide on said conveyor to position approximately the said case beneath a bottle carrying boom, a case detent, a case holding press, a bottle carrying boom, a vertical support for said boom adjacent to said case conveyor, a bottle conveyor in parallel relationship with said case conveyor, the said bottle carrying boom extending transversely across the said case conveyor and said bottle conveyor, a carriage slidable on the said boom, case acting trips on rear of said carriage, lever arrangements on said vertical support acted on by the said case acting trips whereby the said case detent and said case press are released momentarily to permit egress and engress of said case on said case conveyor, a horizontal double acting hydraulic cylinder power means attached to said vertical boom support in horizontal line with said boom, a piston rod emerging from said hydraulic cylinder, the end of said rod attached to the slidable carriage, a track means supported by said boom for said carriage to ride on, a hydraulic control valve for the said horizontal cylinder, the said valve permitting simultaneously entry of fluid under pressure and exit of fluid ahead of moving piston in said hydraulic cylinder power means, a means on each end of said boom actuated by a vertically movable bottle carrier controlling the movement of said horizontal carriage, a vertically movable hydraulic cylinder power means mounted on top of said horizontally slidable carriage, a piston rod extending through an aperture in the said slidable carriage, a plate depending from end of said extending piston rod capable of moving vertically, extensible slide arms retractably mounted below said plate, a fixed rack on the side of said boom, a gear and slidable shaft arrangement journaled in said slidable carriage and said plate and extending therethrough in contacting engagement with said rack, a gear on end of said shaft below the said carrier plate, pinion racks on said extensible slide arms in meshing engagement with said gear below the carrier, a means on said vertically movable carrier plate to engage valve trip lever arrangements, valve trip lever arrangement mounted on said boom actuated when the said carrier is in the lower and upper positions, whereby the discharge valve of the vertical hydraulic means is opened when the slidable carriage is at either end of the boom, and closed when the carrier is in the lower position, which simultaneously opens the pressure valve to raise the said carrier plate and maintaining said pressure until the slidable carriage plate reaches the other end of said boom; a parallel bar arrangement suspended from said extensible slide arms, a swing out bell-crank arrangement and pin therefor to swing out from beneath the said extensible slides arms, a bottle gripping means, a spring means to return said bottle gripping beneath the said extensible slide arms, the bottle gripping means comprising two opposing longitudinal claws in a face to face relationship suspended from a common block the said blocks attached to the swing out ends of the said parallel bar arrangement beneath the extensible slide arms, a spring means acting on said longitudinal claws to keep the same in a closed position, a shaft depending centrally from the said block and between the tongs of said claws, longitudinal reenforcing rods positioned in the horizontal plane with the said shaft, a cam mounted on said centrally depending shaft the said shaft being in contactable juxtaposition with said reenforcing rods, levers on said cam shaft to turn cam into contact with said reenforcing rods whereby the said longitudinal claws are opened and remain open until the lever is tripped shut, means depending from the end of said boom to trip said cam acting levers when the carrier is in position over the single file bottle conveyor and a means attached to the said vertical support for the boom, adjacent the case conveyor, to trip the said levers when the carrier is in position over the opening of the case positioned on the case conveyor.

29. A container arranging device comprising at least two extensible arms movable in juxtaposition with each other, at least one container gripper depending from each arm, each of said container grippers capable of engaging a single row of a group of containers within a case, and all of the said container grippers acting in concert whereby the case can be loaded or unloaded in one stroke, and the pattern of the said containers in the original grouping is changed while moving to a preselected pattern in substantially the same plane, a means to mount said extensible arms, means to move at least one of said arms laterally and longitudinally, a means to open said grippers, and a means to close said grippers.

30. The assembly of claim 29 suspended from a vertically movable elevator and a means for horizontally moving the said suspended assembly.

31. A case loading and unloading device comprising a means to engage the containers, a means to raise or lower said container engaging means, a means to move transversely said means to raise and lower the said container engaging means, a means to rearrange the said container engaging means to form the desired preselected group pattern of containers comprising means to engage one section of containers in a pattern group and a second means to engage another section of containers within the said pattern group and a means to move the said engaged container section means in relation to other to produce another group pattern within the same plane, the said means to form said patterns comprising at least two extensible arms movable in relation to each other, each of the said extensible arms carrying at least one of said container engaging section means and a means with relative lateral motion in juxaposition with said extensible arm carrying at least one of said container engaging section means and a means in juxtaposition with said arm and said section to move laterally and longitudinally the said container engaging section means to form the said desired preselected group pattern.

32. An apparatus for handling articles comprising a means to engage and disengage articles, the said means depending from a support, another similar article engaging and disengaging means depending from another support, the said supports being in slidable, extensible, parallel juxtaposition, a means to maintain said supports in said slidable parallel juxtaposition and a means to move said supports and the said dependent article engaging and disengaging means from a spaced apart parallel relation to an in-line-tandem position whereby articles are rearranged from one group pattern to another preselected group pattern.

33. In a container handling apparatus for automatically transferring containers from a single lane conveyor to a shipping case comprising a frame, a container gripper support mounted for movement in the frame back and forth in alternate registration with said conveyor and case, a plurality of rows of container grippers carried by said support for engaging and holding the containers during movement of the support means to effect relative movement of said rows of said grippers with respect to each other laterally and longitudinally, and motion transmitting members upon movement of the support toward the case to arrange said grippers and the containers carried thereby in a preselected group pattern for deposit in the case.

34. A container handling apparatus for automatically transferring containers back and forth between a single lane conveyor and a shipping case comprising a frame, a container gripper support, a plurality of rows of container grippers carried by the support, a guide structure for the support, power means operable to move said support back and forth along the guide structure for alternate registration with said conveyor and case, and motion transmitting members connected to the grippers and operable during such back and forth movement of the support to effect relative movement of said rows of grippers with respect to each other laterally and longitudinally from one group pattern to a different group pattern.

35. A container handling apparatus for automatically transferring containers from a position wherein the containers are arranged in one spatial pattern to another position wherein the containers are arranged in a different spatial pattern comprising a frame, a container gripper support, a series of container grippers on the support, a guide structure for the support, power means connected to said support and operable to move the said support back and forth from one position to the other, and motion transmitting members connected to said grippers and operable during such back and forth movement of said support to move relatively said grippers with respect to each other laterally and longitudinally to a pattern complemental to the pattern of the containers in the position toward which said grippers are being moved.

36. An article position changer comprising a frame, a plurality of supports mounted in said frame, each of said supports having article gripper means operable to engage a group of articles arranged in a row and a motion transmitting means operable to move relatively said supports with respect to each other laterally and longitudinally between an in-line-tandem relation and a spaced apart, side-by-side parallel relation to load and unload said articles, or vice versa.

37. A container handling apparatus for automatically transferring containers from a single line conveyor to a shipping case comprising a frame, a carriage reciprocally movable in the frame from a position above the conveyor to a position above the shipping case, a container gripper support mounted on the carriage for vertical movement, a series of container grippers attached to said support, a power means operable to effect vertical movement of said container gripper support to move the container grippers carried thereby into and out of juxtaposition with the containers positioned on said conveyor and in said case, means operable to cause said grippers to grip containers positioned on the conveyor and to release containers upon deposit thereof in the shipping case, motion transmitting connections engaging said grippers operable to effect diverse horizontal motion to said grippers to effect a single file arrangement of said grippers as they move toward the containers on the conveyor and to move said grippers relative to said support from said single file arrangement into a preselected group pattern comprising rows during the movement of the grippers in a direction from said conveyor towards the shipping case, and a power means operable to effect reciprocation of said carriage in timed relation to the vertical movement of said supports.

References Cited in the file of this patent

UNITED STATES PATENTS

| | | |
|---|---|---|
| 1,330,524 | Freud | Feb. 10, 1920 |
| 1,486,303 | Ross | Mar. 11, 1924 |
| 1,486,304 | Ross | Mar. 11, 1924 |
| 1,974,837 | Shillinger et al. | Sept. 25, 1934 |
| 2,050,547 | Thayer | Aug. 11, 1936 |
| 2,179,648 | Thayer | Nov. 14, 1939 |
| 2,277,688 | Cattonar et al. | Mar. 21, 1942 |
| 2,358,447 | Creamer | Sept. 19, 1944 |
| 2,524,846 | Socke et al. | Oct. 10, 1950 |